United States Patent
Cleveland et al.

(10) Patent No.: US 7,856,250 B2
(45) Date of Patent: Dec. 21, 2010

(54) APPARATUS AND METHOD FOR MANAGING SOHO BTS INTERFERENCE USING ANTENNA BEAM COVERAGE BASED ON PILOT STRENGTH MEASUREMENT MESSAGES

(75) Inventors: Joseph Cleveland, Murphy, TX (US); Nivi Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 963 days.

(21) Appl. No.: 11/391,108

(22) Filed: Mar. 28, 2006

(65) Prior Publication Data

US 2007/0238414 A1    Oct. 11, 2007

(51) Int. Cl.
 *H04B 1/38* (2006.01)
(52) U.S. Cl. ............... 455/561; 455/501; 455/63.1; 455/67.11
(58) Field of Classification Search ............ 455/562.1, 455/561, 522, 501, 63.1, 65, 66.1, 67.11, 455/67.13, 67.14, 114.2
 See application file for complete search history.

(56) References Cited

U.S. PATENT DOCUMENTS

| | | | |
|---|---|---|---|
| 6,643,520 B1* | 11/2003 | Park et al. | 455/522 |
| 7,283,844 B2* | 10/2007 | Thompson | 455/562.1 |
| 7,593,705 B2* | 9/2009 | Sato et al. | 455/234.1 |
| 2006/0217141 A1* | 9/2006 | Legg et al. | 455/522 |
| 2007/0010277 A1* | 1/2007 | Sato et al. | 455/522 |
| 2007/0224947 A1* | 9/2007 | Campbell et al. | 455/101 |

* cited by examiner

*Primary Examiner*—Lana N Le
*Assistant Examiner*—Ping Y Hsieh

(57) ABSTRACT

A small office/home office base transceiver station (SOHO BTS) server capable of managing interference by correlating pilot strength measurements sent by mobile devices and directing the attenuation settings for each transmit path. An array of antennas coupled to an array of transmit paths are selectively activated one at a time. When a transmit path is activated, the SOHO BTS server sets the associated variable attenuator to its maximum level. The SOHO BTS server detects whether a radio environment report or and a pilot strength measurement message (PSMM) containing information about a mobile station's pilot strength is present. When the pilot strength is greater than a predetermined value, the SOHO BTS server increases the setting on the attenuator. Otherwise, the SOHO BTS server decreases the attenuator setting until such pilot strength information is available or if the lowest attenuator setting has been set. The other transmit paths are also tested accordingly.

20 Claims, 5 Drawing Sheets

APPARATUS AND METHOD FOR MANAGING SOHO BTS INTERFERENCE USING ANTENNA BEAM COVERAGE BASED ON PILOT STRENGTH MEASUREMENT MESSAGES

TECHNICAL FIELD OF THE INVENTION

The present disclosure is directed, in general, to wireless communication systems and, more specifically, to the management of interferences from small office or home office wireless communication devices.

BACKGROUND OF THE INVENTION

Inadequate coverage is a persistent problem in the quality of service of any wireless network. Natural and man-made obstacles frequently create radio frequency (RF) holes in the coverage area of a wireless network. Voice and data call connections are frequently dropped when a wireless terminal, such as a cell phone or a similar mobile station, enters an RF hole. Mobile stations that are already in an RF hole may not be able to reliably establish new connections. Typical areas in which RF holes occur include homes, apartments, underground tunnels and office buildings.

Furthermore, wireless communication networks complimented by small base transceiver stations located to provide coverage in RF holes can frequently encounter coverage issues (e.g., interference from neighboring devices) that cause RF coverage holes. Even when such devices are configured to detect each other and adapt overall or directionally transmit power accordingly, interference may remain a problem.

For instance, a pair of small office or home office (SOHO) base transceiver stations in adjacent buildings may not detect each other due to outside wall penetration losses. A mobile or subscriber unit between or inside one of the two buildings, however, may detect both base transceiver stations even after taking into account factors such as distance, differences in interior versus exterior wall penetration losses, or both. Thus, the signal from the first SOHO base transceiver station (BTS) interferes with the signal from the second SOHO base transceiver station (BTS), or vice versa. This interference scenario is sometimes referred to as the hidden node problem." Conventional adaptive interference controls for a SOHO BTS may provide for power control into a single antenna. For example, some adaptive interface controls currently use solitary dipole or monopole antennas. Such controls fail to provide selective reduction of transmitted RF power that could ultimately cause interference.

A SOHO BTS is typically placed within the confines of a SOHO and generally provides sufficient transmit power to overcome the attenuation of interior walls and floors. Often times, a SOHO BTS supplements a macrocell network where coverage is poor. Ideally, a SOHO BTS should operate without introducing significant interference to the external coverage environment. However, in practice, a SOHO BTS is often subjected to high interference.

In a code division multiple access (CDMA) environment, pilot strength (Ec/Io) is the ratio of received pilot energy (Ec) to total received energy or the total power spectral density (i.e., noise and signals) (Io) at the current CDMA frequency. Many systems known in the art report the number of pilots in an active set to a base station by a Power Measurement Report Message (PMRM), Pilot Strength Measurement Message (PSMM), Registration Message (RM) or similar. Currently, however, there is no system for analyzing pilot strength measurements to aid in tailoring the transmit power pattern to provide coverage in a small office or home office and minimize interference external to the small office or home office.

There is therefore a need for a system to manage power adjustments and minimize the impact of interference with a macroBTS or any neighboring SOHO BTSs and thereby greatly reducing interior coverage. Moreover, there is a need for providing wireless operators for limiting interference to wireless services external to the SOHO.

SUMMARY OF THE INVENTION

The present disclosure provides a small office and home office (SOHO) base transceiver station (BTS) Management Server that optimizes RF coverage while limiting interference to other SOHO cells or macrocells by correlating pilot signal strengths from mobile stations.

In one embodiment of the disclosure, a system is provided for managing interference between two or more base transceiver stations having one or more transmit paths, the system comprises a variable attenuator coupled to one of the transmit paths; and a controller capable of directing a setting for the variable attenuator based on the magnitude of a received pilot signal from at least one of: a radio environment report; and a pilot strength measurement message (PSMM). The controller is capable of: directing the variable attenuator to increase a present attenuation setting if the received pilot signal is greater than a predetermined threshold; directing the variable attenuator to decrease a present attenuation setting if no pilot signal is received; and directing the variable attenuator to decrease the present attenuation setting until the pilot signal is greater than a predetermined threshold.

The controller is also capable of: directing the variable attenuator to decrease the present attenuation setting until the present attenuation setting is at its minimum setting; and setting the variable attenuator an initial maximum setting before directing the setting for the variable attenuator. In addition, the controller is capable of selectively activating one of the transmit paths at a time.

In another embodiment of the disclosure, a method is provided for managing interference between two or more base transceiver stations having a plurality of transmit paths. The method comprises: directing a setting for a variable attenuator coupled to one of the transmit paths based on the magnitude of a received pilot signal from at least one of: a radio environment report; and a pilot strength measurement message (PSMM). The method may further comprise directing the variable attenuator to increase a present attenuation setting if the received pilot signal is greater than a predetermined threshold; directing the variable attenuator to decrease a present attenuation setting if no pilot signal is received; and directing the variable attenuator to decrease the present attenuation setting continues until the received pilot signal is greater than a predetermined threshold.

The method may direct the variable attenuator to decrease the present attenuation setting continues until the present attenuation setting is at its minimum setting. The method may also include setting the variable attenuator an initial maximum setting before directing the setting for the variable attenuator. In addition, the method may comprise selectively activating one of the transmit paths at a time. When there is a second variable attenuator coupled to a second one of the transmit paths, the method may further comprise directing a setting for the second variable attenuator based on the magnitude of a received pilot signal from at least one of: a second radio environment report; and a second pilot strength measurement message (PSMM).

In another embodiment of the disclosure, a system is provided for managing interference between two or more base transceiver stations within a small office or home office (SOHO) and external to the SOHO. The system comprises a base transceiver station server coupled to an array of antenna elements, wherein the base transceiver station server is capable of selectively directing the array of variable attenuators coupled to the array of antenna elements to eliminate interference based on the magnitude of a received pilot signal from at least one of: a radio environment report; and a pilot strength measurement message (PSMM).

The base transceiver station server is further capable of: directing the variable attenuator to increase a present attenuation setting if the received pilot signal is greater than a predetermined threshold; directing the variable attenuator to decrease the present attenuation setting if no pilot signal is received; and directing the variable attenuator to decrease the present attenuation setting until the present attenuation setting is at its minimum setting. In addition, the base transceiver station server may also be capable of selectively activating one of the transmit paths at a time; and setting the variable attenuator an initial maximum setting before directing the setting for the variable attenuator.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
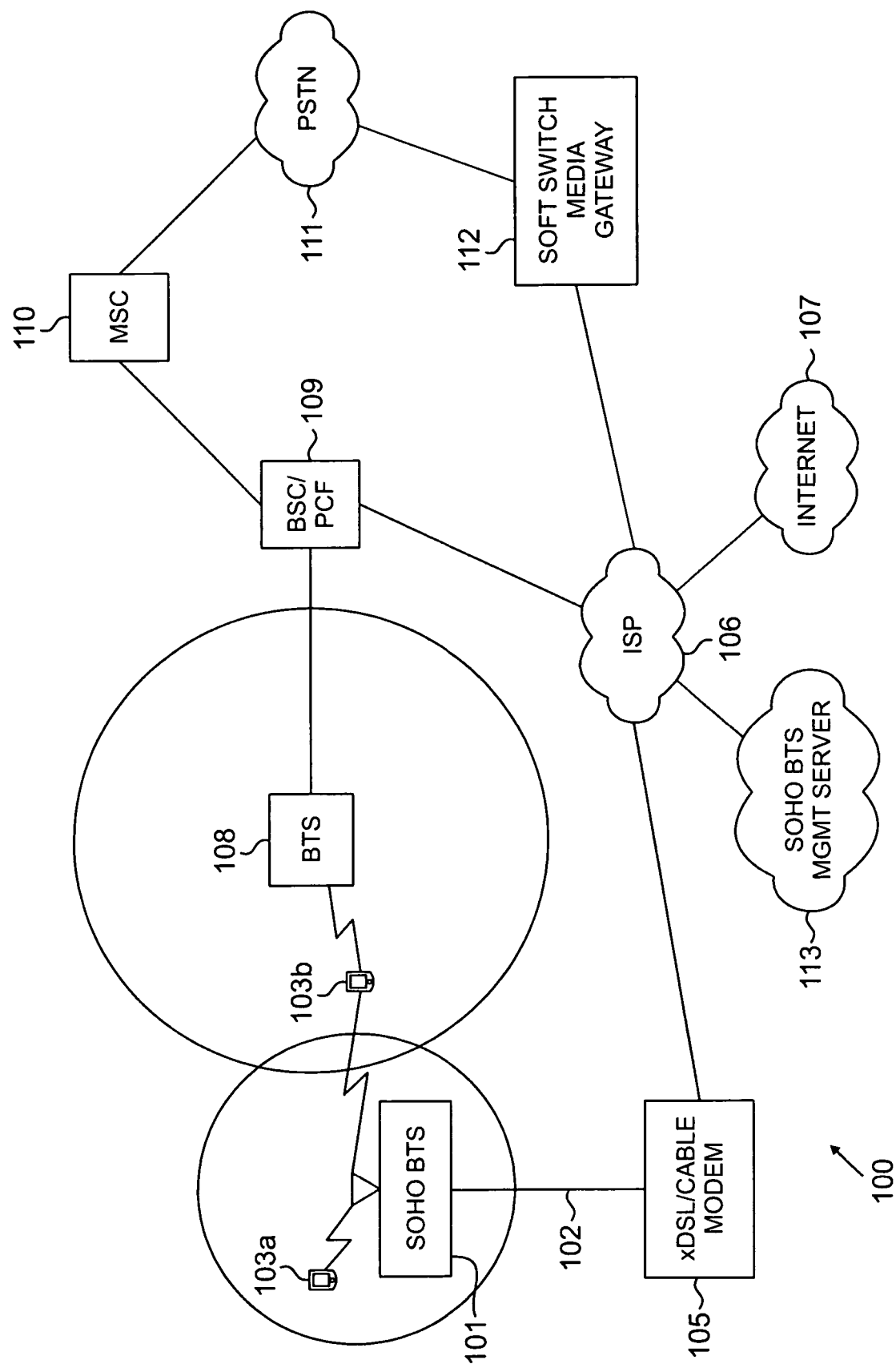
FIGS. 1, 1A and 1B are high-level block diagrams of a wireless network and portions thereof having a small office/home office base transceiver station according to one embodiment of the disclosure.

FIG. 1 is high-level diagram of a wireless network and portions thereof having a small office or home office base transceiver station according to one embodiment of the present disclosure. A wireless network 100 includes a small office or home office (SOHO) base transceiver station 101 ("SOHO BTS"). Mobile stations 103a and 103b are capable of wirelessly connecting to SOHO BTS 101. SOHO BTS 101 comprises connection 102 to an asymmetric digital subscriber line (ADSL) or symmetric digital subscriber line (SDSL) (collectively xDSL) or cable modem 105. xDSL/cable modem 105 is connected to an Internet service provider (ISP) 106 which, in turn, is connected to the Internet 107. Mobile stations 103a and 103b are also capable of connecting to a conventional wireless base station transceiver BTS 108 and others not shown.

BTS 108 is coupled to, for example, a base station controller (BSC) 109 with optional Packet Control Function (PCF). BSC/PCF 109 may be coupled to ISP 106. In addition, BSC/PCF 109 also may be coupled to mobile switching center (MSC) 110 which, in turn, is coupled to public-switched telephone network (PSTN) 111. Preferably, a soft switch media gateway 112 is coupled to ISP 106 and PSTN 111, respectively. SOHO BTS Management Server 113 is also connected to the ISP 106 and is configured to monitor the transmit powers in each of the different transmit paths as described later in detail herein.

Those skilled in the art will recognize that the components depicted and described herein form a portion of and operate in conjunction with a larger wireless communications network having a number of macrocells (such as but not limited to the network 100 depicted in FIG. 1), with small BTSs 101a and 101b and subscriber unit or mobile device 103a located in one such macrocell. For simplicity and clarity, however, only so much of the construction and operation of the overall wireless communications network and the components therein as is unique to the present disclosure or necessary for an understanding of the present disclosure is depicted in FIGS. 1A and 1B and described in detail herein.

Figure 1A:
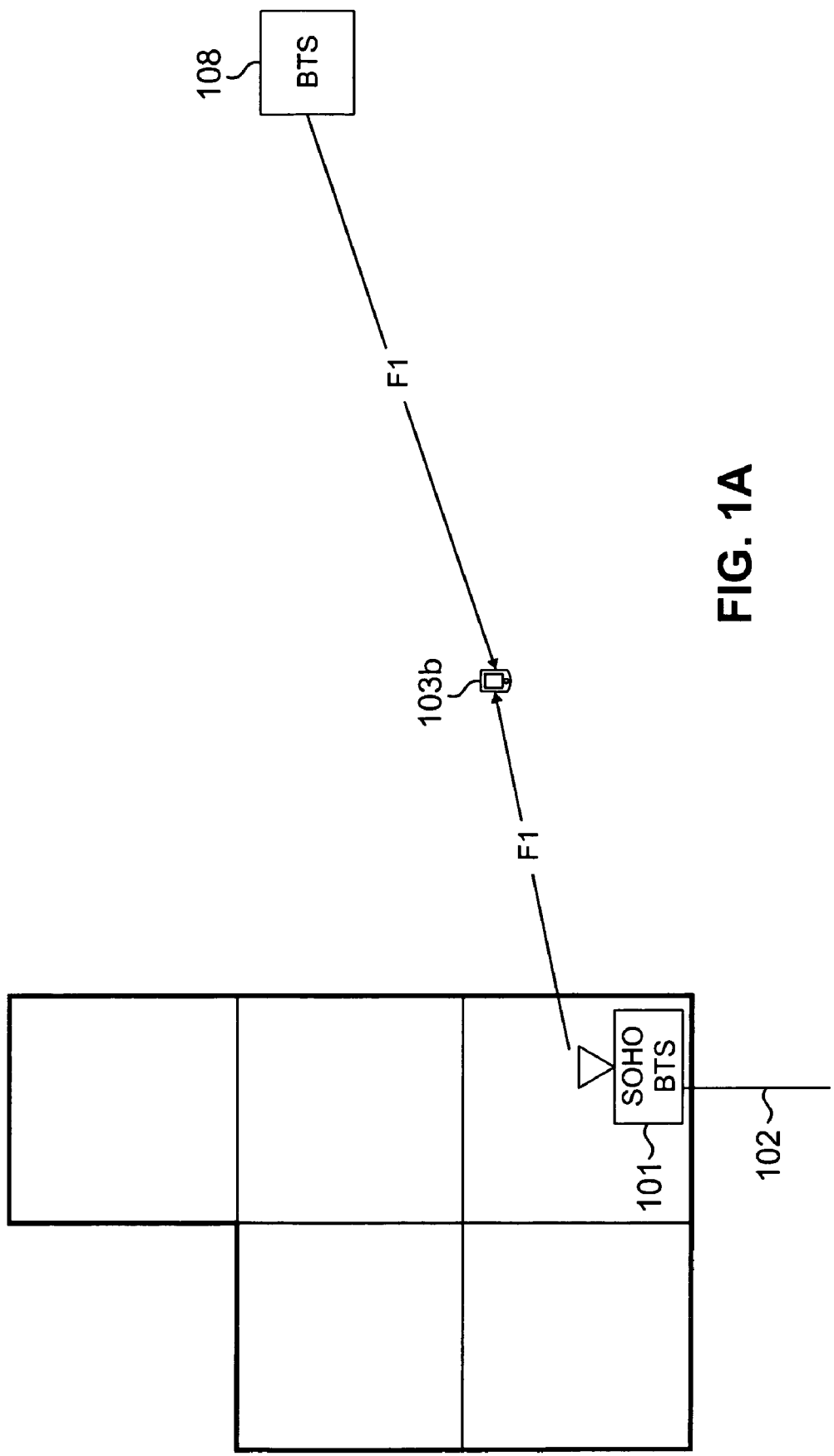

For in-building applications, a SOHO BTS 101 is located within the confines of the small office or home office as shown in FIG. 1A. SOHO BTS 101 provides sufficient transmit power to overcome attenuation of the interior walls and floors. SOHO BTS 101 also provides sufficient transmit power to enable wireless communication with mobile device 103a when mobile device 103a does not receive sufficient power from BTS 108 for wireless communication with BTS 108. In other words, SOHO BTS 101 supplements a macrocell network where the coverage is poor due to propagation loss or obstructions, or where no wireless service is provided but xDSL or cable broadband services exists through wireline connections. However, where wireless communications through a macro BTS 108 is provided in the area including the small office or home office, SOHO BTS 101 should operate without introducing significant interference to the external coverage environment. To economically provide coverage within a small office or home office without limited interference to wireless services external to the small office or home office, adaptive interference control may be implemented.

In a preferred embodiment, SOHO BTS 101 operates on the same wireless channel (F1) as BTS 108 as depicted in FIG. 1A. SOHO BTS 101 interferes with the signal reception from BTS 108 by MS 103b. Operation using the same carrier channel is necessary where, for example, spectrum is not available for dedicated small BTS operation. SOHO BTS 101 preferably transmits sufficient power to overcome interior wall (and ceiling/floor) penetration losses in order to provide sufficient signal strength to a mobile device within a distant room. However, since the outside wall or window attenuation may be less that the total interior wall penetration loss, a strong signal may be transmitted through the outside wall to interfere with the external coverage provided by the macrocell network through BTS 108. This interference could be so severe as to cause a mobile device 103 a call failure, loss of pilot and experience handoff failure.

Figure 1B:
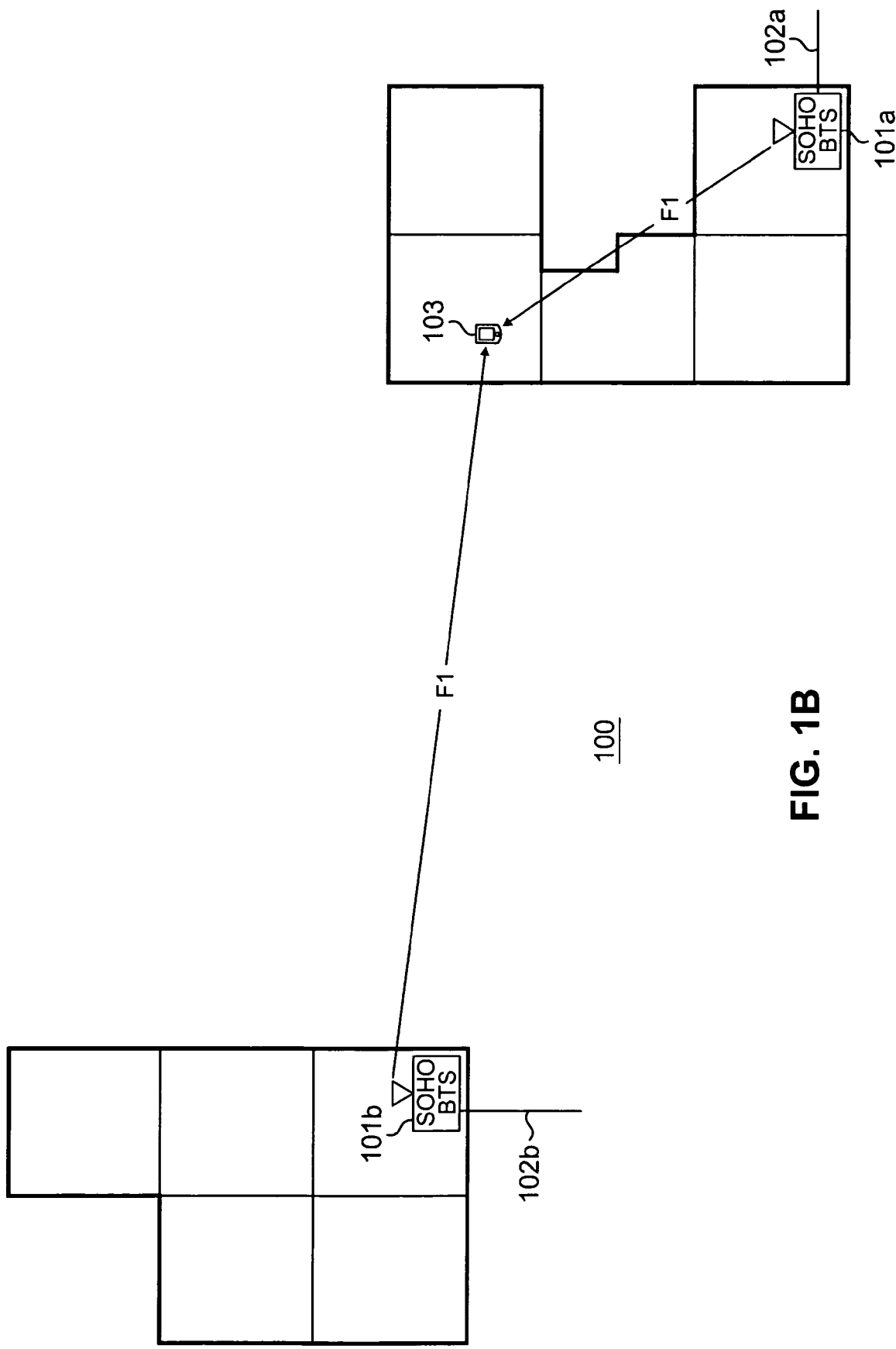

FIG. 1B illustrates SOHO BTS 101a (in one home) interfering with the operation of SOHO BTS 101b (in an adjacent home). This interference scenario is sometimes referred to as the "hidden node problem." Due to the differences between outside wall penetration loss and total interior wall penetration loss, interference with an adjacent SOHO BTS cell can occur. Often times, the wall penetration loss and propagation loss between SOHO BTS 101a and SOHO BTS 101b, for example, is too great for each to discover the other. In the scenario shown in FIG. 1B, SOHO BTS 101a and SOHO BTS 101b are located within the confines of an office building or home to supplement a macrocell network where either coverage is poor or there is no wireless service but broadband wireline service exists. SOHO BTS 101a and SOHO BTS 101b provide sufficient transmit power to overcome the attenuation of interior walls and floors in the building (depicted by the thinner lines), and inadvertently, also to overcome the attenuation of exterior walls (depicted by the thicker lines). SOHO BTS 101a and SOHO BTS 101b are located proximate to a broadband wireline (e.g., T1, cable or digital subscriber line) access point for the respective buildings. Each SOHO BTS 101a and SOHO BTSS 101b has a connection 102a and 102b, respectively, to a broadband wireline communications system (not shown).

A fixed or mobile "subscriber" device 103 is preferably capable of wireless communication with both BTS 101a and BTS 101b as depicted in FIG. 1A. Mobile device 103 may be any device having such communication capability such as a telephone, wireless electronic mail and/or Short Message Service (SMS) text messaging device, and/or a personal digital assistant (PDA), or a desktop or laptop computer, etc. BTS 101a, BTS 101b and mobile device 103 are capable of communicating with each other using any one or more of the IEEE 802.11, IEEE 802.16, IS-95 Code Division Multiple Access (CDMA) (also referred to as TIA-EIA-95 or "cdmaOne"), CDMA 2000, CDMA 1X, and/or CDMA 1xEV-DO standards.

Figure 2:
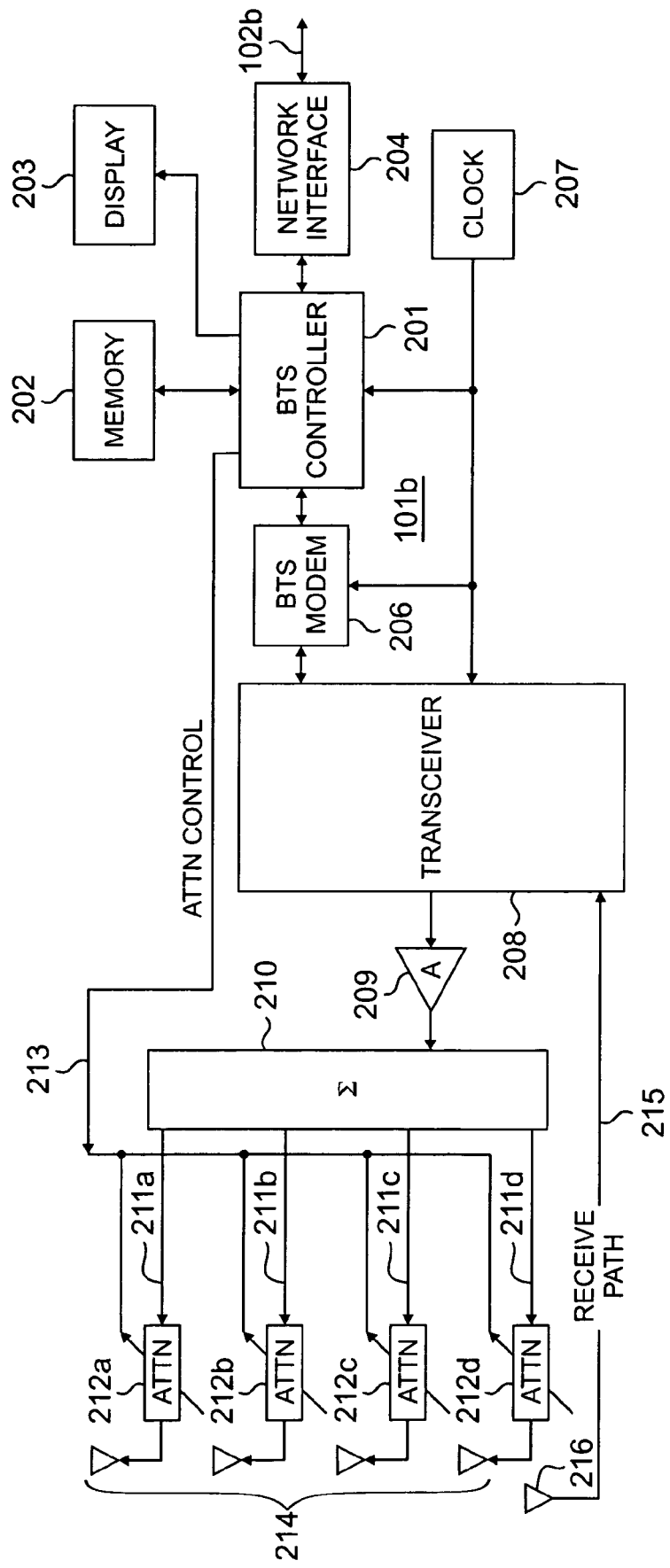
FIG. 2 is a high-level block diagram of a small office/home office base transceiver station according to one embodiment of the disclosure.

FIG. 2 is a high-level block diagram of a small office/home office base transceiver station (e.g., SOHO BTS 101b) according to a preferred embodiment of the present disclosure. In this embodiment, BTS 101b includes a processor or controller 201, memory 202, display 203 and network interface 204, all operating using a common clock source 207. The common wireless communications transmit chain from transceiver 208, which includes an amplifier (A) 209 and an aggregator ( ) 210, is split into multiple paths. In the example shown in FIG. 2, there are four such transmit paths: 211a, 211b, 211c and 211d (collectively referred to as 211). Although the example shown depicts four transmit paths 211, it should be understood that any number of transmit paths 211 may be used. The transmit power for each path 211a, 211b, 211c and 211d is independently controlled by a variable attenuator (ATTN) 212a, 212b, 212c and 212d, respectively (and collectively referred to as 212).

Attenuator 212 is controlled by attenuation signal 213 from processor/controller 201. Each transmit signal path 211 is connected to a different antenna element 214. A separate receive path 215 from antenna element 216 to transceiver 208 is also provided. Attenuator 212 may be adjusted for different settings and transmit power level. Preferably, attenuator 212 settings and transmit power level are adjusted in accordance with the system and method disclosed in U.S. Provisional Patent Ser. No. 60/687,229, entitled "Auto Adaptive Technique to Mitigate RF Interference," filed Jun. 3, 2005, and is incorporated herein. In order to minimize interference between different SOHO BTS units, the settings and transmit power level of attenuator 212 are preferably set to minimize the interference between different SOHO BTS units. When discovery of the interior structures is complete, the processor/controller 201 sets the attenuation value for each attenuator 212 within a particular transmit path 311.

Periodically, SOHO BTS Management Server 113 (FIG. 1) deactivates all but one of the transmit paths 211. For example, SOHO BTS Management Server 113 may initially deactivate paths 211a, 211b and 211c, but keep path 211d active. Accordingly, SOHO BTS Management Server 113 sets the corresponding attenuator 212 for the activated transmit path 211 to the maximum value (e.g., $X_n$). The active path 211 is thus at its minimum power level. Following the example given above, for the active path 211d, attenuator 212d would be set to the maximum value, $X_n$.

At this initial minimum power level, SOHO BTS Management Server 113 determines if any external mobile terminals respond with a Registration Message containing a Radio Environment Report or a Pilot Strength Measurement Message (PSMM) that includes the SOHO BTS pilot. It should be understood, however, that other types of messages bearing pilot strength information may also be used. If no Registration Message or PSMM is received with a pilot signal above a predetermined threshold, attenuator 212 is set to the next value (e.g., $X_{n-1}$) and the process is repeated until either: (1) the received pilot signal strength is above a predetermined threshold; or (2) attenuator 212 has been set to its lowest value (e.g., $X_0$). Again, following the example given above, initially attenuator 212d would be set to $X_n$. If a Registration Message or PSMM is not received with a pilot signal strength above a predetermined threshold, SOHO BTS Management Server 113 sets attenuator 212d to the next lowest value $X_{n-1}$.

The process for the activated transmit path 211 finally ceases when either attenuator 212 minimum value ($X_0$) is reached or the SOHO BTS pilot is detected in a Registration Message or PSMM with a pilot strength ($E_c/I_o$) that exceeds a specified threshold. In other words, continuing with our example, while transmit path 211d is selected, SOHO BTS Management Server 113 decrements the attenuator 212d setting until: (1) a SOHO BTS pilot is detected exceeding the specified threshold; or (2) when attenuator 212d is finally set at its lowest possible setting ($X_0$). The receipt of a Registration Message or PSMM with the SOHO BTS pilot with a pilot strength that exceeds a specified threshold indicates that the SOHO BTS 101b interferes with a macro BTS 108 or neighbor SOHO BTS 101a. The activated attenuator 212 is then set to the immediate previous value by SOHO BTS Management Server 113.

Again referring to the above example, if a pilot strength exceeding a specified threshold is detected when attenuator 212d is set to the $X_{n-3}$, SOHO BTS Management Server 113 sets attenuator 212d to the $X_{n-2}$ setting. Alternatively, if the attenuator 212 continues to decrement the attenuator 212 level to the lowest possible setting ($X_0$) without receiving the requisite SOHO BTS pilot, then SOHO BTS Management Server 113 remains idle until a triggering event. Triggering events may include, for example, a BTS 101a or BTS 101b in initial power up, expiration of a predetermined period, or a changing BTS position.

The process is repeated for each of the remaining SOHO BTS transmit paths 211 as they are triggered. Referring to the example given above, after completing the process with path 211d and receiving a triggering event, SOHO BTS Management Server 113 sets, for example, attenuator 212c for transmit path 211c, to the maximum value ($X_n$). The newly selected path 211c is thus at its minimum power level. The process is then repeated as described above based on an initiation from a triggering event.

It should be understood that a transceiver 208 may include only one transmit path 211. For example, suppose transceiver 208 includes an amplifier (A) 209 with only one transmit path 211a (as opposed to four transmit paths 211 described earlier). The SOHO BTS Management Server 113 keeps transmit path 211a active and sets transmit path 211a at it minimum power level by setting attenuator 212a to a maximum value, $X_n$. At this initial minimum power level, SOHO BTS Management Server 113 determines whether any external mobile terminals respond with a Registration Message containing a Radio Environment report or a Pilot Strength Measurement Message (PSMM) that includes the SOHO BTS pilot. It should be understood, however, that other types of messages bearing pilot strength information may also be used. If no Registration Message or PSMM is received with a pilot strength above a predetermined threshold, attenuator 212a is set to the next value (e.g., Xn−1) and the process is repeated until either: (1) the received pilot signal strength is above a predetermined threshold; or (2) attenuator 212a has been set to its lowest value (e.g., $X_0$). The entire process is repeated by setting transmit path 211a to the minimum power level setting after a triggering event occurs.

The present disclosure uses independent control of the RF power coupled into different antennas oriented in different directions in order to enable the discovery of directions where interference might occur. The present disclosure also combines the use of pilot strength reported in a Registration Message or PSMM as described in U.S. Provisional Patent Ser. No. 60/687,229, entitled "Auto Adaptive Technique to Mitigate RF Interference," filed on Jun. 3, 2005 and is incorporated herein. The coverage area is controlled by the set of antennas based on receipt of registration message from an external mobile station. SOHO BTS Management Server 113 adjusts the power of the individual antennas in the set of antennas, each of which oriented in different directions, in order to provide adaptive control of the coverage area by this set of antennas based on receipt of registration message from an external mobile station. Thus, SOHO BTS Management Server 113 strategically places RF power where it is needed, and provides increased and efficient use of the spectrum of a deployed network.

Figure 3:
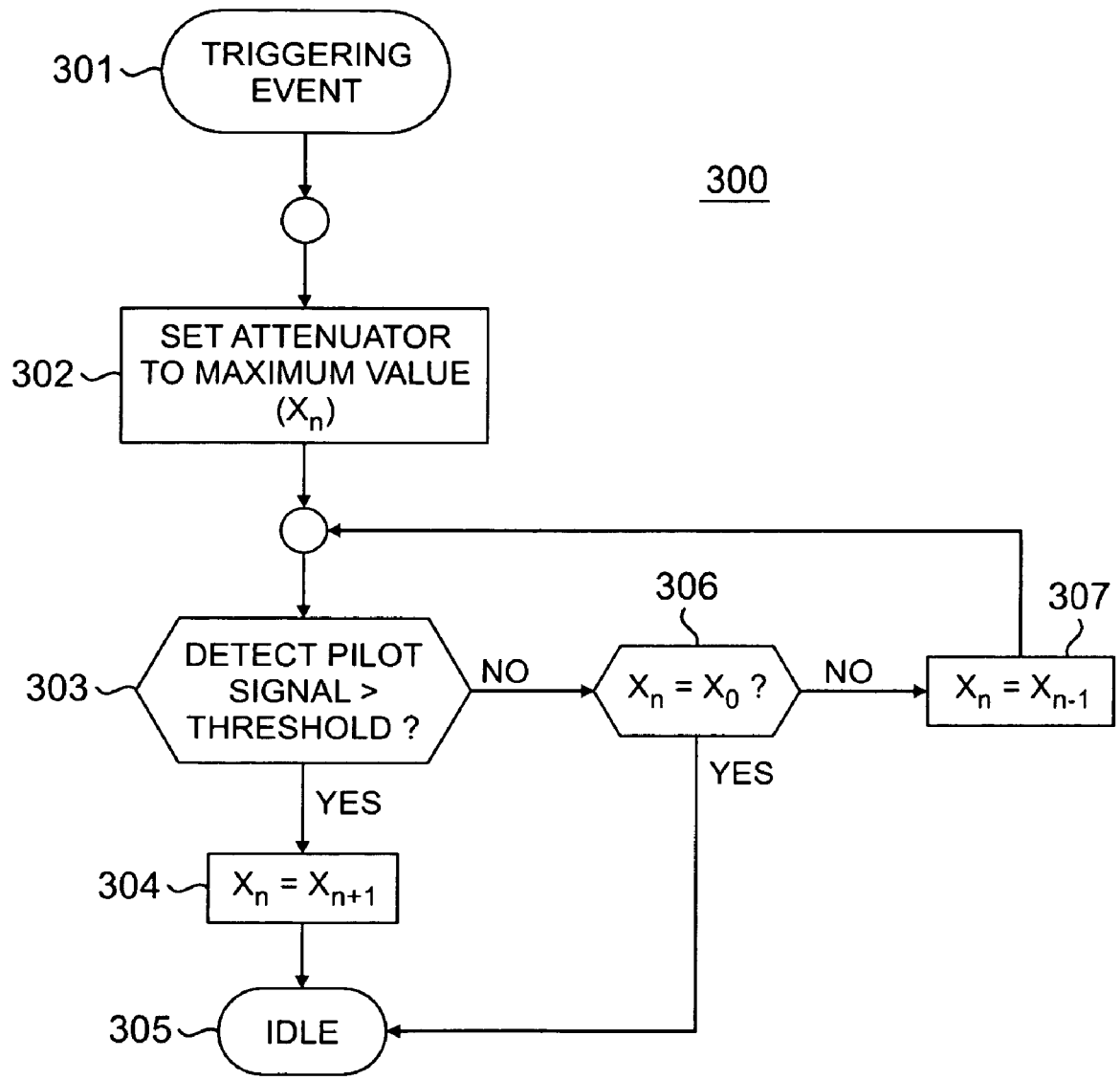
FIG. 3 is a high level flowchart for a process of managing transmit power in a small office/home office base transceiver station according to one embodiment of the present disclosure.

FIG. 3 is a high level flowchart for a process of managing interference from SOHO BTS units by using pilot strength measurement messages send by mobile stations according to one embodiment of the present disclosure. Process 300 is primarily performed by BTS Management Server 201. Process 300 typically begins with a triggering event (step 301), which could include, for example, BTS 101a or BTS 101b being powered up, expiration of a predetermined period, or a change in the orientation of a BTS. After a triggering event occurs, SOHO BTS Management Server 113 activates one of the transmit paths 211 and deactivates all of the other transmit paths 211. Accordingly, SOHO BTS Management Server 113 sets the attenuator 212 coupled with activated transmit path 211 to the maximum value ($X_n$). The remaining path 211 is thus at its minimum power level.

At this initial minimum power level, SOHO BTS Management Server 113 determines if any external mobile terminals have responded with a Registration Message containing a Radio Environment Report or a Pilot Strength Measurement Message (PSMM) that includes the SOHO BTS pilot (step 303). If, however, no Registration Message or PSMM is received, SOHO BTS Management Server 113 checks to see if attenuator 212 has been set to its lowest value ($X_0$) (step 306). If the attenuator 212 setting is not $X_0$, SOHO BTS Management Server 113 sets attenuator 212 to the next value ($X_{n-1}$) (step 307) and process 300 is repeated by SOHO BTS Management Server 113 (beginning with step 303).

On the other hand, if SOHO BTS Management Server 113 detects that the attenuator is indeed set to its lowest value, $X_0$, (step 306) then SOHO BTS Management Server 113 increments the setting ($X_{n+1}$) (step 304) and remains idle (step 305) until SOHO BTS Management Server 113 detects another triggering event (step 301). If a Registration Message or PSMM is indeed received with a pilot signal above a predetermined threshold, process 300 continues and SOHO BTS Management Server 113 decrements the attenuator setting (step 304) and SOHO BTS Management Server 113 becomes idle (step 305). Process 300 remains idle until SOHO BTS Management Server 113 detects another triggering point and begins the process again (step 301).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for managing interference between two or more base transceiver stations having one or more transmit paths, the system comprising:
   a variable attenuator coupled to each of the transmit paths; and
   a controller configured to:
      activate one of the transmit paths;
      deactivate all of the other transmit paths;
      direct a variable attenuator associated with the one active transmit path to set a present attenuation setting to a maximum value;
      direct the variable attenuator to decrease the present attenuation setting until a received pilot signal is greater than a predetermined threshold; and
      direct the variable attenuator to increase the present attenuation setting by one level once the received pilot signal is greater than the predetermined threshold.

2. The system according to claim 1, wherein a transmit power level of the one active transmit path is decreased when the variable increases the present attenuation setting.

3. The system according to claim 1, wherein the controller is further configured to direct the variable attenuator to decrease the present attenuation setting if no pilot signal is received.

4. The system according to claim 1, wherein the received pilot signal is from one of a radio environment report and a pilot strength measurement message (PSMM).

5. The system according to claim 1, wherein the controller is further configured to direct the variable attenuator to decrease the present attenuation setting until the present attenuation setting is at its minimum setting.

6. The system according to claim 1, wherein the received pilot signal is from an external mobile terminal.

7. The system according to claim 1, wherein the controller is further configured to selectively activate one of the transmit paths at a time.

8. A method for managing interference between two or more base transceiver stations having a plurality of transmit paths, the method comprising:
activating one of the transmit paths;
deactivating all of the other transmit paths;
directing a variable attenuator associated with the one active transmit path to set a present attenuation setting to a maximum value;
directing the variable attenuator to decrease the present attenuation setting until a received pilot signal is greater than a predetermined threshold; and
directing the variable attenuator to increase the present attenuation setting by one level once the received pilot signal is greater than the predetermined threshold.

9. The method according to claim 8 wherein a transmit power level of the one active transmit path is decreased when the variable attenuator increases the present attenuation setting.

10. The method according to claim 8 further comprising directing the variable attenuator to decrease the present attenuation setting if no pilot signal is received.

11. The method according to claim 8, wherein the received pilot signal is from one of a radio environment report and a pilot strength measurement message (PSMM).

12. The method according to claim 8, wherein directing the variable attenuator to decrease the present attenuation setting continues until the present attenuation setting is at its minimum setting.

13. The method according to claim 8, wherein the received pilot signal is from an external mobile terminal.

14. The method according to claim 8 further comprising selectively activating one of the transmit paths at a time.

15. The method according to claim 8 further comprising a second variable attenuator coupled to a second one of the transmit paths.

16. The method according to claim 15 further comprising directing a setting for the second variable attenuator based on the magnitude of a received pilot signal from at least one of:
a second radio environment report; and
a second pilot strength measurement message (PSMM).

17. A system for managing interference between two or more base transceiver stations within a small office or home office (SOHO) and external to the SOHO, comprising:
a base transceiver station server coupled to an array of antenna elements, wherein the base transceiver station server is configured to:
activate a transmit path associated with one of the antenna elements;
deactivate transmit paths associated with all of the other antenna elements;
direct a variable attenuator coupled to the active antenna element to set a present attenuation setting to a maximum value;
direct the variable attenuator to decrease the present attenuation setting until a received pilot signal is greater than a predetermined threshold; and
direct the variable attenuator to increase the present attenuation setting by one level once the received pilot signal is greater than the predetermined threshold.

18. The system according to claim 17, wherein the base transceiver station server is further configured to:
direct the variable attenuator to decrease the present attenuation setting if no pilot signal is received.

19. The system according to claim 17, wherein the base transceiver station server is further configured to selectively activate one of the transmit paths at a time.

20. The system according to claim 17 wherein the received pilot signal is from one of a radio environment report and a pilot strength measurement message (PSMM).

* * * * *